United States Patent [19]
Ellwood

[11] 4,193,664
[45] Mar. 18, 1980

[54] OPTICAL FIBER CONNECTOR

[75] Inventor: George Ellwood, Harlow, England

[73] Assignee: International Standard Electric Corporation, New York, N.Y.

[21] Appl. No.: 929,249

[22] Filed: Jul. 31, 1978

Related U.S. Application Data

[63] Continuation of Ser. No. 776,785, Mar. 11, 1977, abandoned.

[51] Int. Cl.² ............................................. G02B 5/14
[52] U.S. Cl. .................................................. 350/96.21
[58] Field of Search ............... 350/96.20, 96.21, 96.22; 250/227

[56] References Cited

U.S. PATENT DOCUMENTS

| | | | |
|---|---|---|---|
| 3,885,859 | 5/1975 | Dalgleish et al. | 350/96.21 |
| 3,948,582 | 4/1976 | Martin | 350/96.21 |
| 3,954,338 | 5/1976 | Hennel | 350/96.21 |
| 3,984,174 | 10/1976 | Landgreen | 350/96.21 |
| 4,019,806 | 4/1977 | Fellows et al. | 350/96.21 |

*Primary Examiner*—Stewart J. Levy
*Attorney, Agent, or Firm*—Thomas L. Peterson

[57] ABSTRACT

To adjust an optical fiber radially in a connector element, the fiber is supported in a tube which is mounted near its mating end on a thin diaphragm with radial adjusting screws at the other end of the tube to rock the tube for adjustment purposes. Thus a relatively coarse screw movement gives fine adjustment to enable the fiber end to be accurately aligned with the fiber end of a mating connector element. The two elements are located with respect to each other by flats on the surface of one element which cooperate with a V-groove in an inner surface of the other element.

4 Claims, 3 Drawing Figures

OPTICAL FIBER CONNECTOR

This is a continuation of application Ser. No. 776,785, filed Mar. 11, 1977, now abandoned.

BACKGROUND OF THE INVENTION

This invention relates to a connector for coupling two optical fibers, one of which may be the termination for a laser unit mounted in one element of the connector. The connector may also be used for coupling two fibers.

With optical fiber connectors it is desirable for the two fibers to be accurately aligned to minimize the loss of light as it passes from one fiber end to the other fiber end. The connector should also be capable of being unmated and mated again without loss of alignment. The purpose of the present invention is to provide such a connector.

SUMMARY OF THE INVENTION

According to one aspect of the invention, there is provided a connector assembly in which a first connector element has an optical fiber mounted within it with its end flush with an end face of the element. The element has two longitudinally extending flats on its outer surface which intersect so as to define a V. A second connector element has an optical fiber mounted within it and has an extension portion projecting toward the first element when the elements are to be mated. The extension portion has a cut-away part with a V-shaped internally-contained recess so dimensioned as to snugly receive the V defined by the flats on the first element. The second element also has latch means engaging the first element when the elements are mated with the V defined by the flats of the first element mounted in the V-shaped recess of the second element. Fine adjustment means is provided on one of the elements so that the fiber end thereof can be adjusted with respect to the fiber end of the other element.

According to another aspect of the invention, there is provided a connector element for an optical fiber. The end of the fiber is mounted in a tubular support member which is supported within a hollow body of the connector element. The support member is supported in the body by a flexible diaphragm adjacent to the end face of the fiber and by adjustment means at the other end of the support member. The support member is adjustable radially by the adjustment means. The distances between the end face of the fiber and the diaphragm and between the diaphragm and the adjustment means are such that a relatively coarse adjustment of the adjustment means gives a relatively fine adjustment of the position of the fiber end.

DESCRIPTION OF THE PREFERRED EMBODIMENT

The connector described herein was designed to couple a laser unit terminated in a short length of optical fiber mounted in one element of the connector with a fiber cable the end of which is in the other element of the connector. However, clearly a similar arrangement can be used to couple the ends of two single fiber cables.

One component of the connector—not the one with the laser unit in the first application of the device—accommodates a single optical fiber sheathed in a plastic protective coating and terminated with the fiber centered in a stainless steel ferrule. The objective set was to align the two fibers with a center-to-center tolerance of one ten-thousandth of an inch, and the connector had to allow of unmating and remating without loss of this alignment. Due to the tolerances inherent in any build-up of mechanical parts, e.g. the diameter of the glass fiber alone may vary by several times the total permissible misalignment, any attempt to obtain the alignment by tightening mechanical tolerances would be doomed to failure. Hence, a fine adjustment device is used whereby one fiber is movable to bring it into line with the other after assembly, thus minimizing or eliminating the effect of mechanical tolerances.

Figure 1:
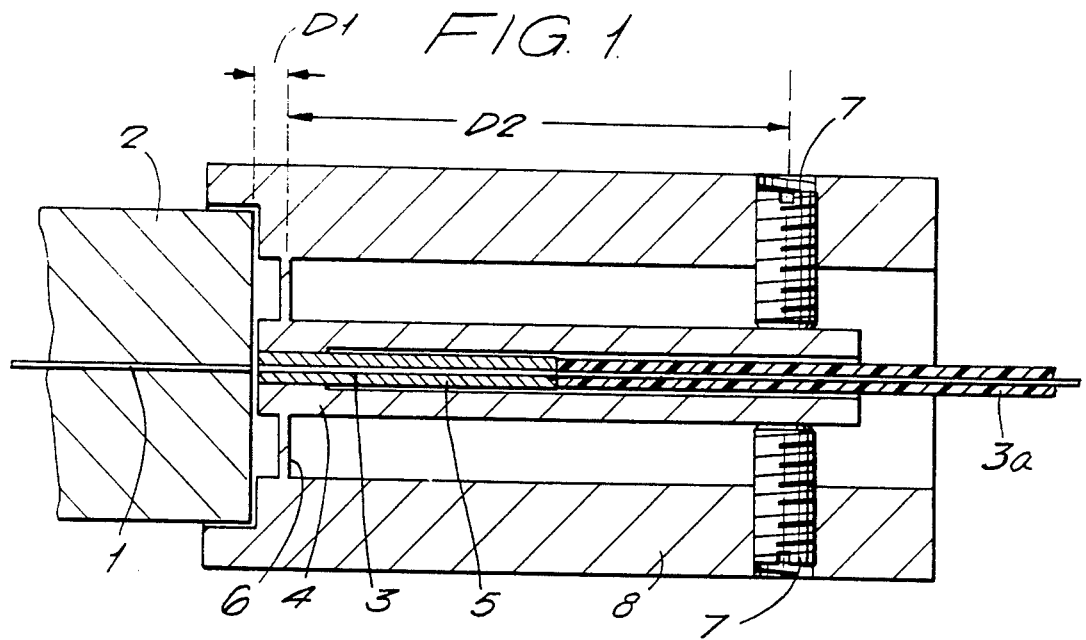
FIG. 1 is a partial sectioned representation of a fiber end alignment device embodying the invention.

FIG. 1 shows the fine alignment device. As shown, a fiber 1 is fixedly mounted in the non-adjustable element 2 of the connector, while the other fiber 3 is mounted within the center tube 4 of the other connector element. This fiber 3 is plastic sheathed—as indicated at 3a—and is held in a steel ferrule 5 mounted in a center tube 4.

The center tube 4 is supported within the hollow body 8 of the connector by an integrally-formed diaphragm 6, which locates the center tube axially, while permitting a small angular movement of the tube by flexing the diaphragm. This flexing is controlled by adjusting scres 7,7, two of which are shown. In the preferred arrangement, see FIG. 3, four grub screws are provided, arranged in cruciform manner.

As seen in FIG. 1, D1 is the distance between the front mating face of the tube 4 and fiber therein and the diaphragm 6, and D2 is the distance between the diaphragm and the adjusting screws 7. By suitable choice of the distances D1 and D2, a very precise movement of the fiber end is obtained for a relatively coarse adjustment of the screws.

In one experimental example, using 2 mm×0.4 mm pitch screws, the ratio of D2:D1 was 8.5 to 1, which gave rather finer movement than is considered essential. In most cases a lower ratio, e.g. 5.5 to 1 gives adequate fineness of adjustment. Preferably, the ratio of D2:D1 should be at least 5 to 1. In the example shown, the diaphragm/center tube assembly is made of spring steel, but beryllium copper can also be used, and may be preferred as it would simplify the heat treatment of the thin diaphragm.

Figure 2:
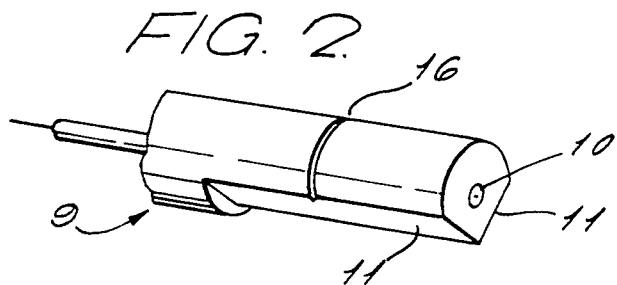
FIG. 2 is a male connector element.
Figure 3:
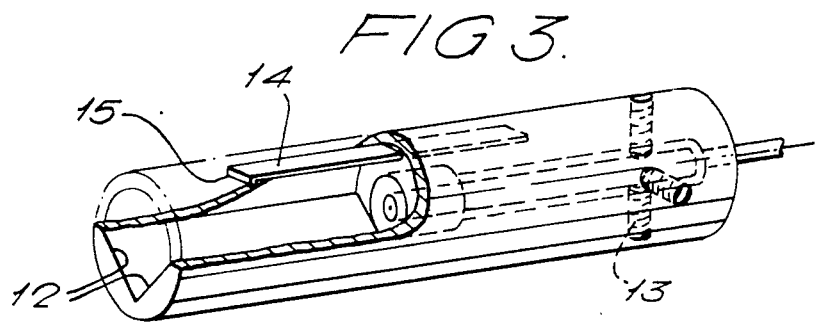
FIG. 3 is a mating female connector element incorporating the alignment device of FIG. 1.

FIGS. 2 and 3 show the male and female elements of a connector. The male element which contains the "fixed" fiber is a cylindrical member 9 of mild steel, with the fiber 10 at its center. This element may, if desired, use case-hardened material instead of mild steel. The male element has two flats 11,11, on its outer surface which intersect as shown to define a V. The female element, FIG. 3, is also cylindrical, with a portion cut away as shown at 12 to leave a V-shaped recess onto which the flats of the male element seat and into which the flats are pressed by spring action. This positively located the male element, and prevents relative rotation between the parts. As can be seen from the broken lines, the female element has a fiber alignment device generally as shown in FIG. 1, with four adjusting grub screws 13 equally spaced apart about the body of the element.

The male element is located axially in the V-groove by a spring strip 14 which has an inwardly-extending nib 15 which seats into a circumferential groove 16 in the male element. The strip functions as a latch for holding the male and female elements axially mated. Also, the spring biases the flats of the male element against the V-shaped recess in the female element.

One example of a connector embodying the invention has an outside diameter of 0.611 inches, the length of the female element being 1.5 inches.

The principles of the arrangement described above may be extended to the manufacture of a multi-way connector, in which case separate fine adjustment devices would be needed for the various fibers. Although such a connector would be somewhat bulky, it may be well useful when the other advantages are paramount, and where size is not of such great significance.

The connector described above can be adjusted to enable the fibers to be aligned after assembly of the connector, so that the build up of mechanical tolerances is over-ridden. This does not means that component tolerances can be relaxed since such relaxation could cause the total error to exceed the possible adjustment. The mechanical advantage D2:D1 (FIG. 1) enables a more precise adjustment to be attained than would otherwise be possible. The V-recess/flats location arrangement provides accurate positioning of the two elements: both the center-to-center line-up of the elements and errors due to relative rotation of the two parts can be controlled.

What is claimed is:

1. An optical fiber connector assembly comprising:
a first connector element adapted to have an optical fiber mounted therein with its end flush with an end face of said first element;
said first element having two longitudinally extending flats on its outer surface, said flats intersecting so as to define a V;
a second connector element adapted to have an optical fiber mounted therein and having an extension portion projecting toward said first element when said elements are to be mated;
said extension portion having a cut-away part with a V-shaped internally-contained recess so dimensioned as to snugly receive said V defined by said flats on said first element;
said second element also having latch means engaging said first element when said elements are mating with said V defined by said flats of said first element mounted in the V-shaped recess of said second element; and
fine adjustment means is provided on one of said elements for precisely laterally adjusting the fiber end thereof with respect to the fiber end of the other element.

2. An optical fiber connector assembly comprising:
a first generally cylindrical connector element adapted to have an optical fiber mounted at or near to its center with its end flush with an end face of said element;
said first element having two longitudinally extending flats on its outer surface extending to said end face, said flats intersecting so as to define a V;
said first element also having a circumferential groove on its outer surface;
a second connector element adapted to have an optical fiber mounted at or near its center and an extension portion projecting therefrom toward said first element when said elements are to be mated;
said extension portion having a cut-away part with a V-shaped internally-contained recess so dimensioned as to snugly receive said V defined by said flats on said first element;
said second element also having a leaf spring generally parallel to said extension portion and having an inwardly-extending nib at its end;
said elements being so dimensioned that when they are mated with said V defined by said flats on said first element mounted in said V-shaped recess of said second element, the nib on said spring fits into said groove; and
fine adjustment means is provided on one of said elements for precisely laterally adjusting the fiber end thereof with respect to the fiber end of the other element.

3. An optical fiber connector assembly comprising:
a first connector element adapted to have an optical fiber mounted therein with its end flush with an end face of said first element;
said first element having two longitudinally extending flats on its outer surface, said flats intersecting so as to define a V;
a second connector element adapted to have an optical fiber mounted therein and having an extension portion projecting toward said first element when said elements are to be mated;
said extension portion having a cut-away part with a V-shaped internally-contained recess so dimensioned as to snugly receive said V defined by said flats on said first element;
said second element also having latch means engaging said first element when said elements are mated with said V defined by said flats of said first element mounted in the V-shaped recess of said second element; and
fine adjustment means is provided on said second element for precisely laterally adjusting the fiber end thereof with respect to the fiber end of the first element.

4. An optical fiber connector assembly comprising:
a first generally cylindrical connector element adapted to have an optical fiber mounted at or near to its center with its end flush with an end face of said element;
said first element having two longitudinally extending flats on its outer surface extending to said end face, said flats intersecting so as to define a V;
said first element also having a circumferential groove on its outer surface;
a second connector element adapted to have an optical fiber mounted at or near its center and an extension portion projecting therefrom toward said first element when said elements are to be mated;
said extension portion having a cut-away part with a V-shaped internally-contained recess so dimensioned as to snugly receive said V defined by said flats on said first element;
said second element also having a leaf spring generally parallel to said extension portion and having an inwardly-extending nib at its end;
said elements being so dimensioned that when they are mated with said V defined by said flats on said first element mounted in said V-shaped recess of said second element, the nib on said spring fits into said groove; and
fine adjustment means is provided on said second element for precisely laterally adjusting the fiber end thereof with respect to the fiber end of the first element.

* * * * *